United States Patent [19]

Kähkipuro et al.

[11] Patent Number: 4,774,650
[45] Date of Patent: Sep. 27, 1988

[54] METHOD FOR DIRECTING POWER BETWEEN THREE-PHASE MAINS AND A D.C. CIRCUIT

[75] Inventors: Matti Kähkipuro; Harri Hakala, both of Hyvinkää, Finland

[73] Assignee: Kone Elevator GmbH, Baar, Switzerland

[21] Appl. No.: 52,234

[22] Filed: May 20, 1987

[30] Foreign Application Priority Data

May 21, 1986 [FI] Finland ................... 862150

[51] Int. Cl.$^4$ ........................ H02M 7/537
[52] U.S. Cl. .................... 363/132; 363/126
[58] Field of Search ............. 363/80, 126, 127, 129, 363/131, 132

[56] References Cited
U.S. PATENT DOCUMENTS

| | | | |
|---|---|---|---|
| 4,272,807 | 6/1981 | Gallagher | 363/126 |
| 4,446,513 | 5/1984 | Clénet | 363/132 |
| 4,447,868 | 5/1984 | Turnbull | 363/81 |
| 4,449,176 | 5/1984 | Turnbull | 363/81 |
| 4,495,557 | 1/1985 | Weit | 363/89 |
| 4,620,272 | 10/1986 | Fulton et al. | 363/53 |

Primary Examiner—Patrick R. Salce
Assistant Examiner—Marc S. Hoff
Attorney, Agent, or Firm—Sughrue, Mion, Zinn, Macpeak and Seas

[57] ABSTRACT

A method for directing the power of a d.c. voltage source between a three-phase mains and a d.c. circuit, which comprises the steps of employing a diode bridge comprising a plurality of first diodes to rectify a three-phase mains voltage to a d.c. voltge when power is flowing from the three-phase mains to the d.c. circuit, converting the d.c. voltage to a three-phase a.c. voltage, when power is flowing from the d.c. circuit to the three-phase mains, by means of transistors in parallel with the diodes, employing control means for controlling the transistors, forming control voltages for the control means by a plurality of second diodes from the three-phase mains in such manner that each the transistor is conductive during the conduction time of the respective diode in parallel therewith, and shortening the conduction times of the transitors, in order to reduce the power circulating in the d.c. circuit, by connecting Zener diodes in series with respective ones of the transistors.

2 Claims, 2 Drawing Sheets

METHOD FOR DIRECTING POWER BETWEEN THREE-PHASE MAINS AND A D.C. CIRCUIT

FIELD OF THE INVENTION

The present invention relates to a method of and apparatus for directing the power of a d.c. voltage source between a three-phase mains and a d.c. circuit, the three-phase mains voltage being rectified to d.c. voltage by a diode bridge when power is flowing from the three-phase mains to the d.c. circuit, and transistors effecting a.c. conversion of the direct voltage into a three-phase voltage, when power is flowing from the d.c. circuit to the three-phase mains, the transistors being connected in parallel with the diodes of the diode bridge and being controlled by suitable control means.

DESCRIPTION OF THE PRIOR ART

There are numerous applications in which a d.c. voltage source is required such that the d.c. voltage source is able both to receive and to give off energy. Such a need exists, for instance, in the case of an inverter driving an a.c. motor supplied from a constant voltage supply, if the load on which the motor operates is able to supply power. An elevator represents a typical load which has the ability to supply power. A field of application for bidirectional power flow that can be contemplated is, for instance, found in transistor and thyristor inverters in a.c. motor drives.

Storage batteries constitute one type of bidirectional d.c. voltage source. However, the use of storage batteries has a number of drawbacks. Thus storage batteries have a short life span. Furthermore, a device is needed to charge a storage battery, and if power is returned in excess of the capacity of the storage battery, the storage battery is no longer able to take up the rest of the energy. The great weight of storage batteries, the dangerous acids contained in them and their high price are further drawbacks.

It is nowadays frequent practice to use for bidirectional d.c. voltage source, between an a.c. mains system and a d.c. circuit, thyristor bridges with and without circulating current, in which the power supplied by the load is fed to the a.c. mains. A circuit without circulating current, implemented by thyristor bridges, is based on the principle that one of two bridges is conductive, depending on the direction of the current. The change-over time between bridges is comparatively long. A circuit without circulating current may also be implemented with the aid of a diode bridge and a thyristor bridge by employing an autotransformer to transmit the circulating power. It is then possible to keep the a.c.-converting thyristor bridge conductive all the time.

In the d.c. circuit of a frequency converter, circulating power losses are produced, owing to the ripple of the d.c. voltage formed from the three-phase mains by full wave rectification. The circulating power may be substantial in elevator inverters, e.g. up to the order of several tens of kilowatts. The circulating power gives rise among other things, to a multitude of harmonics in the mains current. The circulating power is often limited by means of an inductance inserted in the d.c. circuit. It is necessary, with a view to limiting the harmonics produced in the mains current, to use the largest possible inductance. A large inductance is, however, harmful e.g. when an inverter is connected to three-phase mains with the aid of a rectifier. In this case, a voltage surge is generated through the interaction of the capacitance and inductance in the d.c. circuit, which does not occur in the case of normal mains inductances. Also, it can be seen, as another drawback of the inductance, that it causes voltage drops during rapid fluctuations of power load.

In a thyristor bridge circuit with circulating current, both bridges may likewise be kept conductive all the time. There is then no need for separate monitoring of the direction of energy flow. The drawback of thyristor bridge circuits is the complexity of their thyristor control circuits. Furthermore, the time required for thyristors to be triggered and to be turned off is comparatively long.

BRIEF SUMMARY OF THE INVENTION

It is accordingly an object of the present invention to eliminate the above-mentioned disadvantages.

The present invention provides a method for directing the power of a d.c. voltage source between a three-phase mains and a d.c. circuit, which comprises the steps of employing a diode bridge comprising a plurality of first diodes to rectify a three-phase mains voltage to a d.c. voltage when power is flowing from the three-phase mains to the d.c. circuit, converting the d.c. voltage to form a three-phase a.c. voltage, when power is flowing from the d.c. circuit to the three-phase mains, by means of transistors in parallel with the diodes, employing control means for controlling the transistors, applying control voltages to the control means through a plurality of second diodes from the three-phase mains in such manner that each the transistor is conductive during the conduction time of the respective diode in parallel therewith, and shortening the conduction times of the transistors, in order to reduce the power circulating in the d.c. circuit, by means of Zener diodes in series with respective ones of the control means.

The significant advantage of the present invention over thyristor techniques is the greater simplicity and the speed of the control circuitry because the times required to turn the transistors on and off are shorter than those of thyristors. When the transistors are so controlled as to become conductive during part of the diode conduction times only, the circulating power in the d.c. circuit can be reduced without employing large and expensive chokes. Moreover, no voltage drop caused by the choke is experienced during fast variations of power load.

The present invention further provides apparatus for directing the power of a d.c. voltage source between a three-phase mains and a d.c. circuit comprising a plurality of first diodes in a diode bridge for rectifying the three-phase voltage to a d.c. voltage when power is flowing from the three-phase mains to the d.c. circuit, a plurality of transistors connected in parallel with respective ones of the first diodes for converting the d.c. voltage to a three-phase a.c. voltage when power is flowing from the d.c. circuit to the three-phase mains, a plurality of control means for controlling the transistors, a plurality of second diodes for applying control voltages from the three phase mains to operate the control means so that each of the transistors is conductive during the conduction time of the respective first diode in parallel therewith, and a plurality of Zener diodes connectable in series with respective ones of the control means for shortening the conduction times of the transistors and reducing the power circulating in the d.c. circuit.

The advantage of the apparatus of the present invention is that no separate voltage source is required, once the voltage required by the control means is obtained directly from the three-phase mains. No separate comparators are required because comparison of voltages is effected by the second diodes. Moreover, the circuit is simple.

DETAILED DESCRIPTION OF THE DRAWINGS

Figure 1:
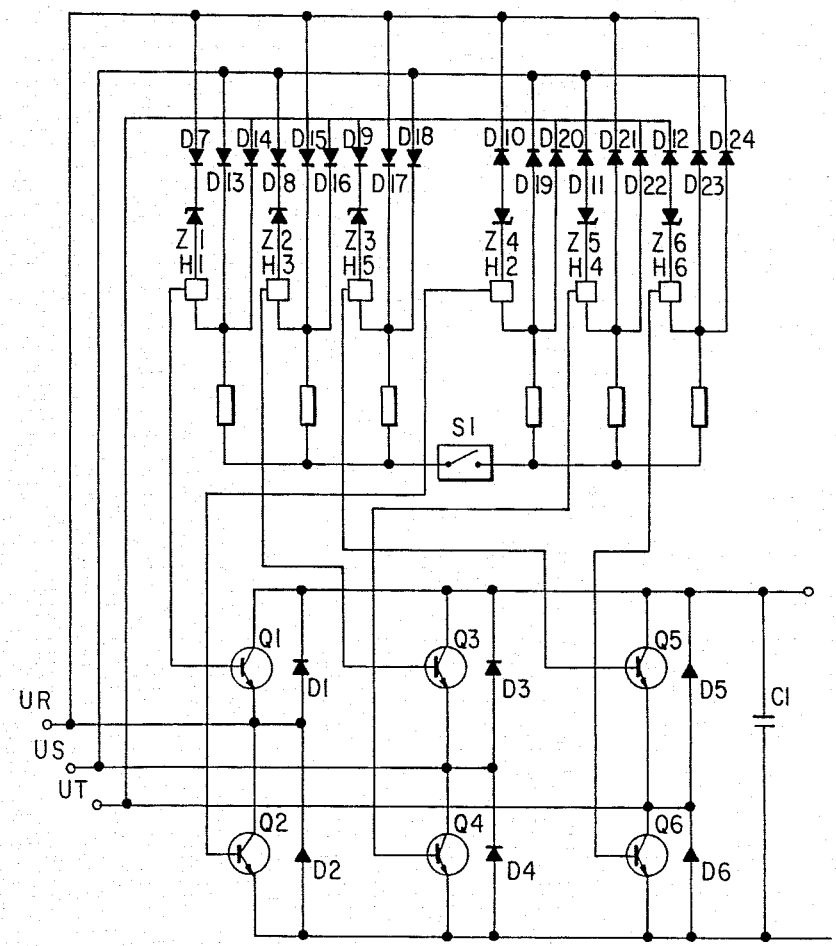
Figure 2:
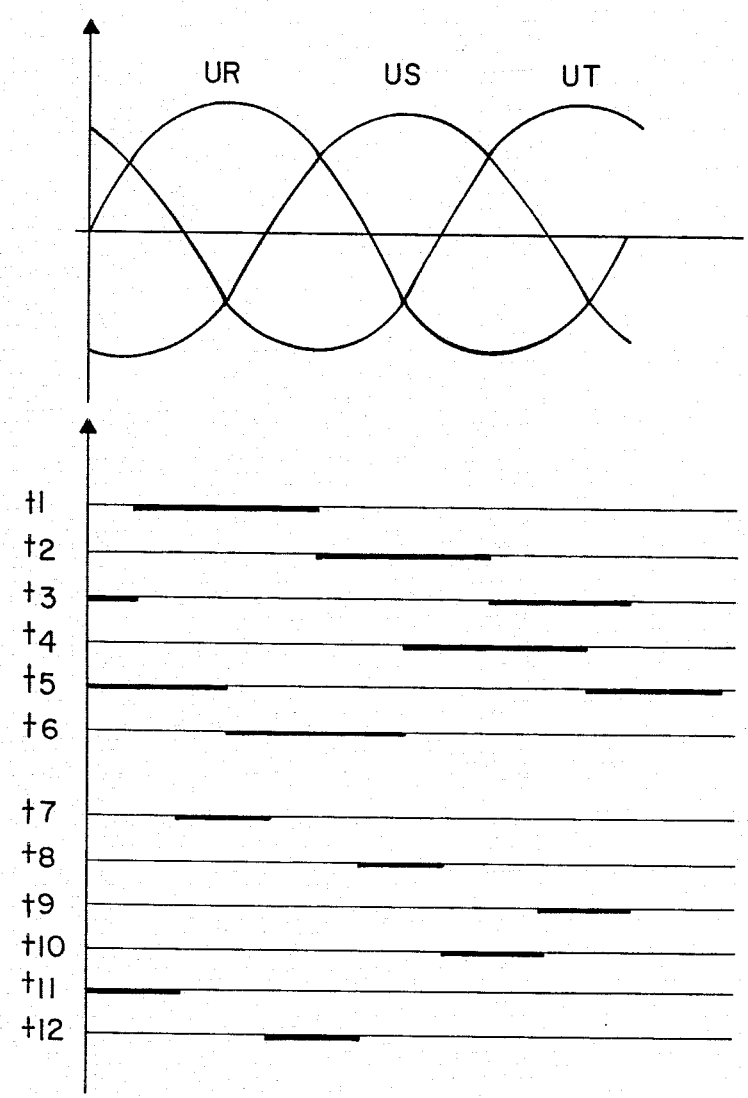

Further features, objects and advantages of the present invention will be apparent from the following description thereof with reference to the accompanying drawings, in which:

FIG. 1 illustrates a d.c. voltage source embodying the invention, and a transistor control unit; and FIG. 2 illustrates the phase voltages of the three-phase mains supplying the d.c. voltage source and the conduction times of the transistors during one period of the phase voltage.

With reference to FIG. 1, a diode bridge has a plurality of transistors Q1–Q6 in parallel with respective diodes D1–D6 of diode bridge. The diode bridge serves as a d.c. voltage source from which a d.c. voltage is obtained which can be supplied e.g. to the inverter controlling an a.c. motor. If the load imposed on the motor, for instance an elevator, is also able to supply power, the returning power is injected into the three-phase mains. For the purpose of directing the power to the three-phase mains supplying the d.c. voltage source, when power is flowing from the d.c. circuit to the three-phase mains, the transistors Q1–Q6 are connected in parallel with the respective diodes D1–D6.

FIG. 2 shows phase voltages UR, US and UT of a three-phase mains supplying the d.c. voltage source, the conduction times t1–t6 of the diodes, and the conduction times t7–t12 of the transistors during one cycle of the phase voltage UR. The phase voltages UR, US and UT determine the conduction times t1–t6 of the diodes D1–D6, so that the respective diode, which is conductive during the positive half-period, connected into each phase is conductive when the voltage in the respective phase is higher than any other phase voltage, and the diode which is conductive during the negative half-period is conductive at those times when the voltage in the respective phase is less than the other phase voltages. For instance, diode D1 is conductive when the voltage UR is positive and higher than the other phase voltages US and UT. Diode D2 is conductive when the voltage UR is negative and lower than the other phase voltages US and UT.

The transistors Q1–Q6 are so controlled by the control unit that each transistor Q1–Q6 is conductive during the conduction time t1–t6 of the respective diode D1–D6 which is parallel therewith.

FIG. 1 also shows a transistor control unit which comprises control means H1–H6 for controlling the transistors Q1–Q6. The control means H1–H6 may be implemented e.g. with the aid of transistors using a double emitter follower circuit, and the control means may be provided with optoisolators for achieving galvanic isolation. The capacitor C1 is provided for filtering the d.c. voltage.

The control unit of FIG. 1 comprises diodes D7–D24 for controlling the transistors Q1–Q6 from the three-phase mains by means of the control means H1–H6 so that each of the transistors Q1–Q6 is conductive during the conduction time of the respective diode D1–D6 in parallel with it. The diodes D13–D24 are used for comparing the voltages in two phases, and in the case of the transistors Q1, Q3 and Q5, which are conductive during the positive half-period, that voltage is chosen which is higher, while in the case of the transistors Q2, Q4 and Q6 which are conductive during the negative half-period, the lower of the two voltages is chosen. For instance, diodes D13 and D14 compare the voltages US and UT and select the higher of the two at each moment, and diodes D19 and D20 compare the voltages US and UT and select that one which is lower at each moment.

The task of the diodes D7–D12 is to supply the control means H1–H6 with control voltages formed from the phase voltages UR, US and UT at those times when the diode D1–D6 connected in parallel with the transistor Q1–Q6 is conductive, in accordance with the conduction times t1–t6 of the diodes, shown in FIG. 2. In order to reduce the current circulating in the d.c. circuit, however, the transistors Q1–Q6 are not allowed to be conductive during the entire conduction time t1–t6 of the diode D1–D6 connected in parallel. In series with each control means H1–H6 there is connected a Zener diode Z1–Z6 to shorten the conduction times t1–t12 of the transistors Q1–Q6. The circulating power resulting from the ripple of the d.c. voltage formed with the aid of full-wave rectification is reduced when the transistors Q1–Q6 are not allowded to be conductive at these times when the pulsating d.c. voltage in the d.c. circuit is at its lowest, because the power flowing is the product of voltage and current, and the current is high at this time. The Zener diodes Z1–Z6 may be composed of a plurality of single Zener diode units.

The voltages of the Zener diodes Z1–Z6 gives rise to an extra voltage drop between each phase voltage UR, US and UT and the respective control means H1–H6. This extra voltage drop has the effect that the conduction times t7–t12 of the transistors Q1–Q6 are shortened because each diode D7–D12 begins to conduct later, and ceases to conduct earlier, than in the absence of the Zener diodes Z1–Z6. With certain voltages of the Zener diodes Z1–Z6, the conduction times t7–t12 of the transistors Q1–Q6 are 50% of the conduction times t1–t6 of the diodes D1–D6, as shown in FIG. 2. The switch S1 may be used to switch the control unit on or off, as required.

It will be apparent to those skilled in the art that different embodiments of the invention are not exclusively confined to the example described in the forgoing and that they may, instead, vary within the scope of the claims presented below.

I claim:

1. A method for directing the power of a d.c. voltage source between a three-phase mains and a d.c. circuit, which comprises the steps of:

employing a diode bridge comprising a plurality of first diodes to rectify a three-phase mains voltage to a d.c. voltage when power is flowing from the three-phase mains to the d.c. circuit;

converting the d.c. voltage into a three-phase a.c. voltage, when power is flowing from the d.c. circuit to the three-phase mains, by means of transistors in parallel with said diodes;

employing control means for controlling said transistors;

applying control voltages to said control means (H1–H6) through a plurality of second diodes (D7–D24) from the three-phase mains in such manner that each said transistor (Q1-Q6) is conductive during the conduction time (t1-t7) of the respective diode in parallel therewith; and shortening the conduction times (t7-t12) of the transistors, in order to reduce the power circulating in the d.c. circuit, by means of Zener diodes (Z1-Z6) in series with respective ones of said control means.

2. Apparatus for directing the power of a d.c. voltage source between a three-phase mains and a d.c. circuit comprising:

- a plurality of first diodes (D1-D6) in a diode bridge for rectifying the three phase voltage to a d.c. voltage when power is flowing from the three-phase mains to the d.c. circuit;
- a plurality of transistors (Q1-Q6) connected in parallel with respective ones of said first diodes (D1-D6) for converting the d.c. voltage to a three-phase a.c. voltage when power is flowing from the d.c. circuit to the three-phase mains;
- a plurality of control means (H1-H6) for controlling the transistors (Q1-Q6);
- a plurality of second diodes (D7-D24) for applying control voltages from the three phase mains to operate the control means (H1-H6) so that each of said transistors (Q1-Q6) is conductive during the conduction time of the respective first diode (D1-D6) in parallel therewith; and
- a plurality of Zener diodes (Z1-Z6) connectable in series with respective ones of said control means (H1-H6) for shortening the conduction times (t7-t12) of said transistors (Q1-Q6) and reducing the power circulating in said d.c. circuit.

* * * * *